Sept. 25, 1945.　　W. E. BOOTH ET AL　　2,385,564
SOLVENT EXTRACTION
Filed June 5, 1941
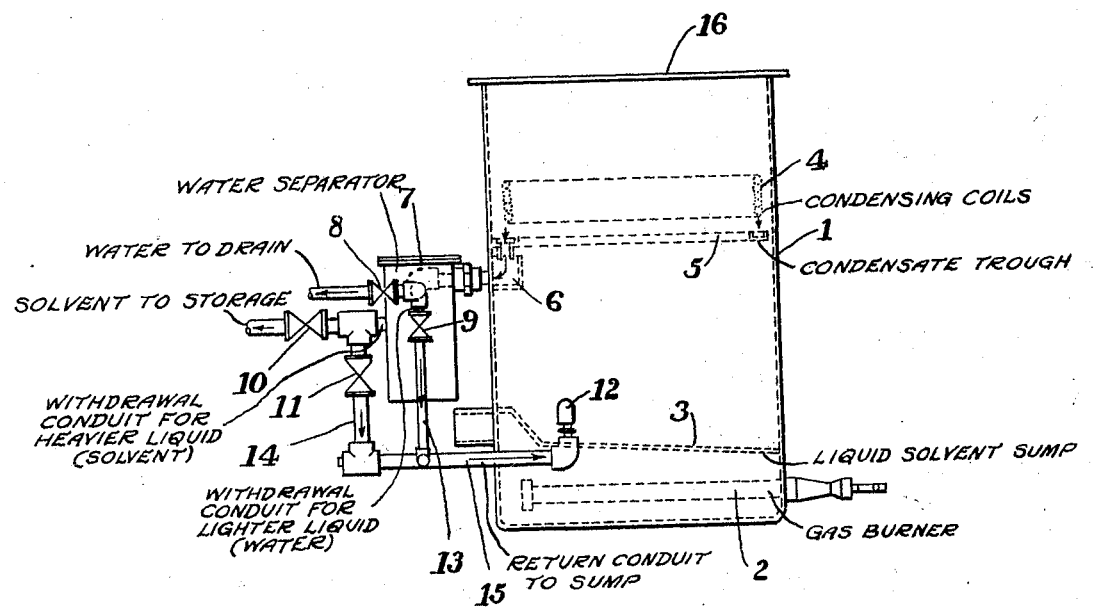
INVENTORS
WILLIAM EDWARD BOOTH
AND RICHARD COSWAY
BY
ATTORNEY Patented Sept. 25, 1945

2,385,564

UNITED STATES PATENT OFFICE 2,385,564

SOLVENT EXTRACTION

William Edward Booth, Runcorn, and Richard Cosway, Penketh, England, assignors to Imperial Chemical Industries Limited, a corporation of Great Britain Application June 5, 1941, Serial No. 396,722
In Great Britain June 19, 1940

5 Claims. (Cl. 202—40)

This invention relates to improvements in solvent extraction, and more particularly to improvements in metal degreasing processes which include steps for recovering solvent from residues obtained in such processes, and to apparatus therefor.

Various types of apparatus have been proposed for treating metal and like non-absorbent articles with a volatile liquid fat solvent, or with solvent vapour, whereby fat and grease are removed and remain dissolved in the solvent. A typical apparatus for such a purpose comprises a tank having in the lower part means for vaporising solvent, and in the upper part cooling coils around the periphery to condense solvent vapours. Normally there is provided immediately beneath the coils a shallow trough in which condensate can be collected and either drawn off, e. g., to a store tank, or allowed to overflow the rim of the trough and flow back into the lower part of the tank to be revaporised. Other solvent extraction processes are known in which volatile solvents are used to extract or remove constituents from the goods treated, as for example, dry cleaning, degreasing wool or textiles, or extracting seeds, fish livers, or bean meal.

In the case of the solutions obtained by any of these processes, most of the solvent can usually be recovered without difficulty by simple distillation, but the removal of the last portions of solvent often presents considerable difficulty on account of the high temperature which is necessary for their volatilisation. In many cases such high temperatures are to be avoided because of the tendency of the solvent, or possibly of the solute, to decompose at such temperatures. Thus in using trichloroethylene to remove oil from the surfaces of metal articles and distilling the solution afterwards to recover trichloroethylene, the oil solution may be heated to between 120° C. and 130° C. without removing all the solvent, and at higher temperatures there is a tendency for the trichloroethylene to decompose. A customary method of removing these last portions of solvent is to divert the undistilled residue containing, say 50–70% solvent, to a separate still and to remove the solvent by steam distillation. This method is only applicable where a source of steam is available, and, moreover, has the disadvantage that when a solvent is used which contains as a stabilizer a small amount of a water-soluble substance, the latter may become separated from the solvent, and the latter then loses its stability. Thus, when using a chlorinated hydrocarbon such as trichloroethylene which has been stabilised against decomposition by the addition of small amounts of triethylamine, the distillate will form two layers, one of solvent and one of water, and what amine does distil will be distributed between the two layers, and on this account the solvent will be deprived of stabilizer.

According to the present invention a solvent extraction process in which a water-immiscible volatile solvent is used and in which the solvent is recovered from residue containing a high proportion of constituents other than solvent includes the steps of adding to such residue an amount of water considerably less than that sufficient for the steam distillation of all the solvent therein, submitting the water-containing residue to indirect heating to distil off water and some of the distillate to separate into an aqueous layer and a non-aqueous layer of solvent, returning the aqueous layer to the still containing the residue while continuing the heating to distil off further quantities of solvent and separately withdrawing the solvent layer. By indirect heating we mean, e. g., gas or electrical heating where the material heated is separated from the heating medium by a heat-conducting surface, as distinct from heating by the introduction of live steam.

When the volatile solvent is a chlorinated hydrocarbon stabilized with an organic compound containing a basic nitrogen atom, e. g., pyridine or triethylamine, we may also add to the residues from which solvent is to be removed a small quantity of a non-volatile basic material such as sodium carbonate or slaked lime, whereby any hydrochloride of the stabilizer which may have formed through decomposition of the solvent during use is decomposed to liberate the free organic base which can be distilled over with the solvent.

In some forms of our invention, as for example in dry cleaning processes, or in metal degreasing with baths of liquid solvent, the solvent containing relatively small amounts of impurities which are, however, big enough to prevent it being used again without purification can first be submitted to direct distillation until the residue in the still contains, say 50–70% of solvent, and is then treated by the method of our invention, either in the same or a different still. In other forms of our invention this preliminary concentration may be unnecessary. Thus, for example, in a vapour type or a liquor-vapour type of metal degreasing apparatus, there will accumulate in the sump of the vapour compartment a residue containing a relatively small amount of solvent, and this residue may be treated directly according to our invention, by diverting it to a special compartment or to a separate still. A small amount of water is added, and, in the case of a chlorinated solvent stabilised as above described, preferably also a small amount of an alkaline material such as sodium carbonate, and the distillation and resolution of the distillate into aqueous and non-aqueous portions is then carried out as described above.

The treatment may be carried out either continuously or intermittently according to the rate at which the residue from the extraction process accumulates. Conveniently the distillate containing water and solvent is delivered to a water separator from which the water can be tapped off continually and returned to the still, while the solvent is returned to the extraction process, either directly, or via a stock tank.

Usually we find it suitable to use an amount of water weighing up to about a fifth of the weight of the solvent in the residue, but a smaller proportion, e. g. a tenth, or a larger proportion, e. g. a third, may be used if desired. Preferably the amount is sufficient to leave the heating surfaces covered when all the solvent has been removed.

According to a further feature of our invention we provide an apparatus for carrying out the above process comprising a vessel having means for vaporising solvent in the lower part by indirect heating, and in the upper part means, e. g., condensing coils for condensing solvent vapour, a water separator to receive the condensate so formed, means to withdraw water from the separator and return it to the said vessel, and means to withdraw the solvent. Suitably the vessel is incorporated in the apparatus for carrying out the solvent extraction process, and means are provided for returning solvent from the water separator directly or indirectly, e. g., via a stock tank, to the extracting compartments of the apparatus.

If desired, the water separator may be external to the vaporiser, and operatively connected to it by suitable pipes, a trough being provided immediately beneath the condensing means to collect the condensate and deliver it to the piping in communication with the water separator. Alternatively, the water separator may be inside the vessel and in direct communication with the trough. Again, the trough itself may be adapted to effect the separation of the condensate into an aqueous layer and a solvent layer, the trough being then provided with means whereby the aqueous layer can be returned to the lower part of the vessel, and means whereby the solvent layer can be transferred to a store tank, or to the solvent extraction compartments as may be desired. Conveniently it is arranged that the lower layer is drawn off through a constant level device which maintains the level of the lower layer in the trough while the upper layer is run off immediately above that level. When the apparatus is intended for use with volatile solvents such as trichloroethylene, which are denser than water, the lower layer will be the one which is delivered to a store tank or solvent extraction apparatus, and the upper aqueous layer can be allowed to flow back into the vaporizer through an overflow at the appropriate level.

Thus the apparatus, as adapted for use with a solvent denser than water, may take the form of a closed tank having steam coils or gas burners for heating the lower part of the tank, while inside, suspended from the top or round the upper part of the walls of the tank, are condensing coils through which cold water or brine can be circulated. Immediately beneath the coils is a relatively deep trough arranged to catch condensate falling from the coils and constructed with a sloping bottom. From near the lowest part of the trough a pipe passes through the wall of the tank in a vapour-tight manner to one leg of an inverted U-tube, the bend of which U is somewhat below the level of the top of the trough, and from which rises a vent pipe extending well above it. The other leg of the U tube is connected to the store tank or solvent extraction apparatus to which distilled solvent is to be delivered. Slightly above the level of the bend of the U tube the trough is provided with an overflow through which liquid can flow back into the tank.

In using this apparatus the solvent-containing residue and an appropriate amount of water are charged into the tank, cooling water is supplied to the condensing coils, and heating of the charge is begun. Steam distillation of the solvent commences, water and solvent condense on the coils, and the condensate falls into the trough where a separation into layers takes place. When sufficient condensate has collected the lower layer, consisting of the solvent, runs off through the inverted U tube as the result of the head of liquid in the trough, but the vent pipe prevents a siphon being set up which would emtpy the trough of both solvent and aqueous layer. Instead, the latter accumulates in the upper part of the trough until it reaches the level of the overflow through which it then flows and drops back into the charge to serve in the steam distillation of more solvent.

When a special receptacle within the vessel is used as a water separator a similar siphon arrangement of piping can be employed to withdraw the layers from it and return them to the store tank or vessel.

Apparatus such as has been described may also be adapted to be used either for a metal degreasing operation or for recovering solvent from solvent-containing residues by arranging that the water and solvent are withdrawn from the separator through separate pipes, each of which is provided with a two-way cock, by which liquid can be returned to the bottom of the tank or to an outside receptacle. By arranging the cocks so that solvent is delivered to an outside container and water is returned to the tank, the apparatus will act as a still for carrying out the solvent recovery process while with the cocks in the reverse positions the apparatus will act as a degreasing apparatus in which any water which is introduced into it on the goods being treated or otherwise, will be automatically rejected and thus prevented from accumulating in the plant, while solvent is returned to the plant to maintain the supply of vapour for degreasing.

Our invention may also be incorporated very conveniently in a metal degreasing apparatus of the type comprising an open-topped vessel, of which the lower part is divided into a number of compartments for holding liquid solvent and one for generating solvent vapour, and in which a circulation of solvent is set up through the various liquid solvent compartments into the vapour generating compartment, while the vapour formed therein is condensed on condensing coils in the upper part of the vessel and is returned to one of the liquor compartments for recirculation. The apparatus is provided with an extra compartment adapted to treat the solvent-containing residues and provided with the water separator, condensing coils, and heating means as specified above, and means, e. g., piping, for delivering solvent from the water separator, to one of the liquor compartments. In using this apparatus there will accumulate in the vapour-generating compartment all the soluble matter removed from the goods in the liquor treating compartments, together with a certain amount of solvent which remains unvaporised at the temperature at which the vapour-generating compartment is operated. This accumulation is delivered, either continuously or intermittently, to the special compartment through appropriate piping, a suitable amount of water is then added, and the solvent recovered. In normal operation, the treatment of the residues will only need to be carried out intermittently, and the times when this compartment is not in use will provide the opportunity for removing the substantially solvent-free oil or grease produced during its operation.

The accompanying diagram represents a sectional elevation of apparatus suitable both for degreasing articles with solvent vapour and for recovering solvent from solvent residues, the solvent being denser than water.

In this diagram the tank 1 has a sloping bottom 3 forming a sump for holding liquid solvent or solvent-containing residues, and beneath it is a gas burner 2 by which they may be heated. Around the perimeter of the upper walls of the tank are condensing coils 4 which can be provided with cooling water by means not shown, and just beneath them is a narrow sloping trough 5, also extending round the perimeter of the walls of the tank, to catch condensate dripping from the coils. At the lowest level of the trough is an orifice through which condensate can flow into receptacle 6 and thence through the piping shown to water separator 7. Liquid can be tapped off from water separator 7 at two places, the one through piping indicated generally by 13 by which water, the lighter liquid, can be withdrawn, and the other through piping indicated generally by 14, by which solvent, the denser liquid, can be withdrawn. Pipes 13 and 14 reach downwards approximately to the level of the solvent sump in the tank and there join pipe 15 by which liquid can be returned to the sump at inlet 12. Inlet 12 is situated somewhat above the level of pipe 15 so that a liquid seal is formed in that pipe preventing vapour passing along it. Between water separator 7 and pipe 15, pipes 13 and 14 are fitted with valves 9 and 11 respectively to control the flow of liquids in the pipes, and between water separator 7 and these valves 9 and 11 are branch pipes fitted with valves 8 and 10 respectively by which liquid can be drawn off. Suitably the branch pipe and valve 10 on the solvent pipe 14 communicate with a store tank, while branch pipe and valve 8 on the water line 13 enable water to be delivered to a drain. The apparatus is also provided with a removable lid 16.

When using this apparatus for recovering solvent from solvent-containing residues, a charge of the residues and appropriate amount of water is put in the tank, lid 16 is placed in position, cooling water is supplied to coils 4, burner 2 is lighted, valves 9 and 10 are opened and valves 8 and 11 are closed. Steam distillation will commence and a mixture of solvent and water will collect in water separator 7 and separate into layers. The water layer will be returned to the sump via valve 9, pipe 13 and pipe 15, while the solvent layer will be discharged to a store tank or drum by valve 10. Ultimately this discharge of solvent will cease, indicating that recovery is complete.

The apparatus may also be used as a solvent vapour or as a hot liquid solvent degreasing apparatus. For this purpose valves 8 and 11 are opened and valves 9 and 10 are closed, lid 16 is removed to allow the introduction or withdrawal of the goods to be treated, and solvent is charged into the tank 1, either almost up to the level of receptacle 6 if it is to be used for hot liquid solvent degreasing, or merely sufficient to fill the sump if it is to be used for vapour degreasing. On supplying cooling water to coils 4 and lighting burner 2, the apparatus will be ready for operation; solvent vapours formed will condense on coils 4 and be returned to the sump through separator 7, valve 11 and pipes 14 and 15, while any water adventitiously introduced will also vaporize, be condensed on coils 4 and travel to separator 7, where it will be rejected through valve 8.

The following is an example of the manner in which the process of our invention can be employed. All parts are by weight.

*Example*

A liquor-vapour metal degreasing apparatus was provided with a subsidiary still to which residues from the sump of the vapour compartment could be delivered, and a water separator to receive the distillate from the subsidiary still from which the water layer could be returned to the still and the solvent layer to the liquor compartment of the metal degreaser. The plant was gas-heated and fitted with a thermostat, whereby the heating ceased when the temperature exceeded 120° C. The degreasing apparatus was charged with trichloroethylene and used to degrease metal articles contaminated with heavy oil. As oil accumulated in the sump of the vapour compartment the mixture of oil and solvent was gradually tapped off into the subsidiary still until 230 parts had collected. This contained 83 parts of oil, the rest being trichloroethylene. This batch was then distilled by adding 30 parts of water and heating so that the distillate collected in the water separator, from which the water layer was returned to the still to serve in the distillation of more of the solvent, and the solvent layer was returned to the liquor compartment. When the distillation process ended 95.4% of the trichloroethylene originally in the residue was recovered. For comparative purposes a similar batch was distilled by the gas heating alone, i. e., without adding any water. 79% of the solvent was recovered when the thermostat cut off the supply of heat; the remainder of the solvent was left in the still.

We claim:

1. In a process for recovering solvent in the solvent-containing residue from a solvent extraction process employing as solvent a volatile chlorinated hydrocarbon stabilized with a water-soluble organic compound containing a basic nitrogen atom, said residue containing a high proportion of constituents other than solvent, the steps of adding water to the said residues in an amount not exceeding a fifth part by weight of the solvent in the residues, submitting the water-containing residue to indirect heating to distil off water and some of the solvent, allowing the distillate to separate into an aqueous layer and a non-aqueous layer of solvent, returning the aqueous layer to the undistilled residues while continuing the heating to distil off further quantities of solvent, and separately withdrawing the solvent layer.

2. In a process for recovering solvent in the solvent-containing residues from a solvent extraction process employing as solvent a volatile chlorinated hydrocarbon stabilized with triethylamine, said residues containing a high proportion of constituents other than solvent, the steps of adding to the said residues a small quantity of a non-volatile basic material and an amount of water considerably less than that sufficient for the steam distillation of all the solvent therein, submitting the water-containing residue to indirect heating to distil off water and some of the solvent, allowing the distillate to separate into an aqueous layer and a non-aqueous layer of solvent, returning the aqueous layer to the undistilled residues while continuing the heating to distil off further quantities of solvent, and separately withdrawing the solvent layer.

3. In a process for recovering a volatile grease solvent in residues from a solvent extraction process employing a volatile chlorinated hydrocarbon solvent immiscible with water and stabilized with a water-soluble organic compound containing a basic nitrogen atom, which residues contain a high proportion of solvent, the step which comprises distilling solvent from the said residues so as to leave concentrated solvent-containing residues, adding to the said concentrated residues a non-volatile basic material and a quantity of water considerably less than that sufficient for the steam distillation of all the solvent therein, submitting the water-containing residue to indirect heating to distill off water and some of the solvent, allowing the distillate to separate into an aqueous layer and a non-aqueous layer of solvent, returning the aqueous layer to the undistilled residues while continuing the heating to distil off further quantities of solvent, and separately withdrawing the solvent layer.

4. In a process for recovering a volatile grease solvent in the residues from a solvent extraction process employing a volatile chlorinated hydrocarbon solvent immiscible with water and stabilized with a water-soluble organic compound containing a basic nitrogen atom, which residues contain a high proportion of solvent, the step which comprises distilling solvent from the said residues so as to leave concentrated residues containing between 50 per cent and 70 per cent of solvent, adding to the concentrated residues a non-volatile basic material and a quantity of water considerably less than that sufficient for the steam distillation of all the solvent therein, submitting the water-containing residue to indirect heating to distil off water and some of the solvent, allowing the distillate to separate into an aqueous layer and a non-aqueous layer of solvent, returning the aqueous layer to the undistilled residues while continuing the heating to distil off further quantities of solvent, and separately withdrawing the solvent layer.

5. In a process for degreasing metal and like non-absorbent articles by subjecting them to the action of a volatile chlorinated hydrocarbon solvent immiscible with water and stabilized with a water-soluble organic compound containing a basic nitrogen atom, whereby solvent contaminated with non-volatile constituents is produced, the steps of distilling the contaminated solvent to give purified solvent and solvent-containing residues, adding to said solvent-containing residues a non-volatile basic material and an amount of water considerably less than that sufficient for the steam distillation of all the solvent in the residues, submitting the water-containing residues to indirect heating to distil off water and some of the solvent, allowing the distillate to separate into an aqueous and a non-aqueous layer, and returning the aqueous layer to the undistilled residues while continuing the heating so as to distil off further quantities of solvent.

WILLIAM EDWARD BOOTH.
RICHARD COSWAY.